US012791537B2

(12) United States Patent
Pedigo et al.

(10) Patent No.: US 12,791,537 B2
(45) Date of Patent: Nov. 10, 2026

(54) METHOD AND APPARATUS FOR MEASURING THE ELECTRICAL PROPERTIES OF MICRO- AND NANOSCALE WIRES

(71) Applicant: The United States of America, as represented by the Secretary of the Navy, Crane, IN (US)

(72) Inventors: Aaron E. Pedigo, Bloomington, IN (US); Derek Lengacher, Odon, IN (US)

( * ) Notice: Subject to any disclaimer, the term of this patent is extended or adjusted under 35 U.S.C. 154(b) by 774 days.

(21) Appl. No.: 17/986,938

(22) Filed: Nov. 15, 2022

(65) Prior Publication Data

US 2023/0251235 A1 Aug. 10, 2023

Related U.S. Application Data

(60) Provisional application No. 63/279,385, filed on Nov. 15, 2021.

(51) Int. Cl.
*G01N 31/10* (2006.01)
*G01N 27/04* (2006.01)

(52) U.S. Cl.
CPC ............. *G01N 31/10* (2013.01); *G01N 27/04* (2013.01)

(58) Field of Classification Search
CPC ...... G01N 27/04; G01N 27/041; G01N 27/92; G01N 31/10
See application file for complete search history.

(56) References Cited

U.S. PATENT DOCUMENTS

| | | | | |
|---|---|---|---|---|
| 7,262,603 B1 * | 8/2007 | Benton | .............. | G01R 31/2812 324/528 |
| 2014/0060907 A1 * | 3/2014 | Kline | ....................... | H05K 1/09 29/829 |
| 2017/0285226 A1 * | 10/2017 | Kakinoki | ................. | G02B 3/00 |

FOREIGN PATENT DOCUMENTS

JP 2010151760 A * 7/2010

OTHER PUBLICATIONS

Yukiko (JP-2010151760-A) English Translation (Year: 2025).*

* cited by examiner

*Primary Examiner* — Jennifer Wecker
*Assistant Examiner* — Jonathan Bortoli
(74) *Attorney, Agent, or Firm* — Naval Surface Warfare Center, Crane Division; Christopher Feigenbutz

(57) ABSTRACT

Provided is a method of breaking down an oxide formed on a tin whisker using a current-limited voltage. A circuit is formed on a region of interest with a pair of probes and a substrate. A first sweep breaks down the oxide formed on the tin whisker and includes a current limiting to prevent the whisker from fusing open. A second sweep is performed at lower voltages that will not produce sufficient current to fuse the whisker open. The electrical resistance of the tin whisker is measured after breaking down the oxide. The inventive method allows for direct measurement of the resistance of metallic whiskers, does not require extrapolation from ideal electrical properties of bulk materials, allows for testing resistance in a variety of environments, and allows for measurement of time dependent variables, such as how long it takes for the oxide to reform in various environments.

20 Claims, 9 Drawing Sheets

METHOD AND APPARATUS FOR MEASURING THE ELECTRICAL PROPERTIES OF MICRO- AND NANOSCALE WIRES

CROSS-REFERENCE TO RELATED APPLICATIONS

The present application claims priority to U.S. Provisional Patent Application Ser. No. 63/279,385, filed Nov. 15, 2021, entitled "METHOD AND APPARATUS FOR MEASURING THE ELECTRICAL PROPERTIES OF MICRO-AND NANOSCALE WIRES," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210796) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to electronic systems. More particularly, it pertains to a method for using micromanipulators in ambient and vacuum environments to measure the resistance of tin whiskers.

BACKGROUND

Metallic whiskers are a risk to electronic systems. Whiskers can grow from unmitigated electronic component terminations, shielding, casings, connectors, lugs, and other module hardware. Whisker growth from metallic finishes has been reported since the 1940's and tin whisker growth since the 1950's. One failure mode that these whiskers can create are unintended electrical shorts between circuits.

Quantifying the risk of tin whiskers requires consideration of the probability and consequence of a whisker induced event. The industry standard GEIA-STD-0005-2 primarily addresses best practices for minimizing the probability of a whisker induced event. Example mitigations to reduce the probability of a whisker induced event include physically verified avoidance of lead (Pb)-free tin-based finishes, increased spacing between opposing nodes, and covering circuit card assemblies (CCAs) with non-conductive conformal coats. The standard also includes circuit analysis, a mitigation strategy that minimizes the consequence of a whisker induced event. A circuit analysis considers the physical spacing and electrical potential between nodes. The potential between nodes is traditionally considered because there is a naturally occurring, protective oxide on tin whiskers. GEIA-STD-0005-2A states that, "voltage required to break through the oxide layer of a tin whiskers was in the range of 5-8 VDC," based on the results of published data.

The consequence of a whisker induced short must also be considered if the short will be sustained or if the whisker will fuse open. GEIA-STD-005-2A states that, "In cases where current is greater than 50 mA . . . the assessment only needs to be done for an intermittent short lasting 50 microseconds."

Predicting the consequence of a whisker induced short requires knowledge of electrical properties, including the electrical resistance of the whisker. Measuring electrical resistance is complicated by the presence of a naturally occurring oxide that acts as a dielectric on the whisker. The voltage difference between nodes must exceed the oxide breakdown voltage for the whisker to get conduction but, typically, the voltage needed to breakdown the oxide results in a current that fuses the whisker open. Additional measurements cannot be made once the whisker has fused open.

When estimates for the resistance of a whisker is needed, the typical approach is to use the ideal resistivity of the pure metal and the dimensions of the whisker to calculate a resistance. This method does not take into account microstructural effects that could cause a deviation from the ideal resistance.

A general assumption within in the metallic whisker community is that whiskers will have an oxide skin on the outside since they typically grow over the course of months to years in an oxygen containing environment. Special cases of inert atmospheres include space and hermetically sealed environments. Oxide skin may not be present in these applications, but obtaining the whiskers for measurement would include exposing the whiskers to oxygen. Removing the oxide skin in an inert atmosphere using a current limited voltage source then measure electrical properties is not intuitively obvious.

Previous work in literature has reported oxide breakdown voltages using current limited voltage sources. The sources used an in-line resistor to limit current. The previous work did not make additional measurements after oxide breakdown. The magnitude of the in-line resistor was typically orders of magnitude greater than expected resistance of a whisker (10 kΩ vs 10 to 100Ω, rendering it impractical to measure resistance using of just the tin whisker.

SUMMARY OF THE INVENTION

The present invention relates to a method of breaking down an oxide formed on a tin whisker using a current-limited voltage. A semiconductor characterization apparatus supplies voltage and measures the resulting current. A circuit is formed on a region of interest of the tin whisker with a pair of probes and a substrate. Two sweeps are performed. The first sweep breaks down the oxide formed on the tin whisker and includes a current limiting to prevent the whisker from fusing open. The second sweep is performed at lower voltages that will not produce sufficient current to fuse the whisker open. The electrical resistance of the tin whisker is then measured after breaking down the oxide. The inventive method allows for direct measurement of the resistance of metallic whiskers that includes potential microstructure effects and does not require extrapolation from ideal electrical properties of bulk materials. The set-up allows for testing resistance in a variety of environments and allows for measurement of time dependent variables, such as how long it takes for the oxide to reform in various environments.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
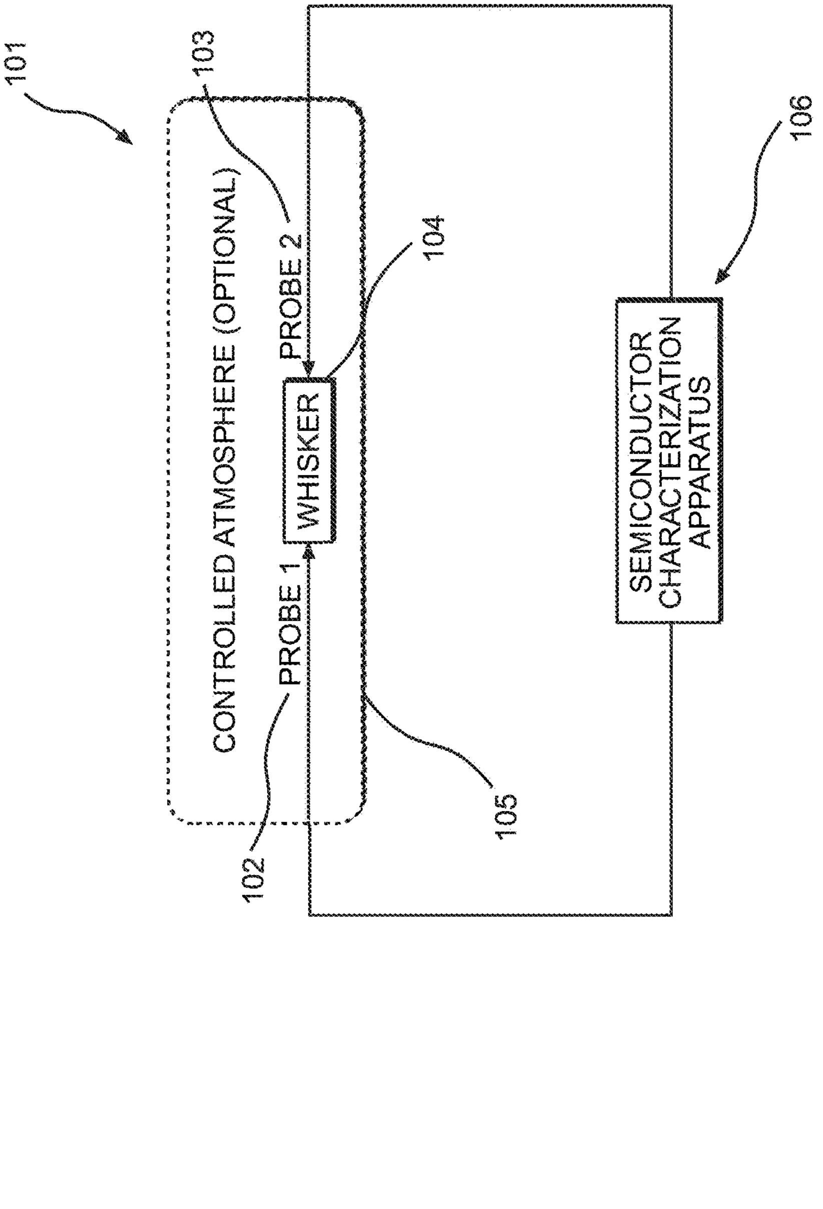
FIG. 1 shows a schematic of the test set-up.

The embodiments of the invention described herein are not intended to be exhaustive or to limit the invention to precise forms disclosed. Rather, the embodiments selected for description have been chosen to enable one skilled in the art to practice the invention.

Generally, in an illustrative embodiment, provided is a method of breaking down an oxide formed on a tin whisker using a current-limited voltage comprising: forming a circuit on a region of interest of the tin whisker with a first probe, a second probe, and a substrate; performing a first sweep of the tin whisker at a first voltage to break down the oxide, wherein the first sweep includes a current limiting to prevent the tin whisker from fusing open; performing a second sweep of the tin whisker at a second voltage that is low enough to prevent the tin whisker from fusing open; and measuring an electrical resistance of the tin whisker after breaking down the oxide.

In an illustrative embodiment, forming the circuit, performing the first and second sweeps, and measuring the electrical resistance are performed in a vacuum environment. In an illustrative embodiment, forming the circuit, performing the first and second sweeps, and measuring the electrical resistance are performed in an ambient environment. In an illustrative embodiment, the voltage is applied with a semiconductor parameter analyzer. In an illustrative embodiment, the voltage is applied with an inline resistor to limit current. In an illustrative embodiment, the second sweep is performed with the resistor removed. In an illustrative embodiment, the circuit is formed with the tin whisker attached to the substrate, the first probe is placed on the substrate, and the second probe is placed on the whisker to delay the time it takes for a damaged oxide to reform.

In an illustrative embodiment, provided is a method of breaking down an oxide formed on a tin whisker using a current-limited voltage comprising: forming a circuit on a region of interest of the tin whisker with a first probe, a second probe, and a substrate, wherein the circuit is formed with the tin whisker attached to the substrate, the first probe is placed on the substrate, and the second probe is placed on the whisker to delay the time it takes for a damaged oxide to reform; performing a first sweep of the tin whisker at a first voltage to break down the oxide, wherein the first sweep includes a current limiting to prevent the tin whisker from fusing open; performing a second sweep of the tin whisker at a second voltage that is low enough to prevent the tin whisker from fusing open; and measuring an electrical resistance of the tin whisker after breaking down the oxide.

In an illustrative embodiment, provided is a method of breaking down an oxide formed on a tin whisker using a current-limited voltage comprising: forming a circuit on a region of interest of the tin whisker; performing a first sweep of the tin whisker at a first voltage to break down the oxide, wherein the first voltage is selected to prevent the tin whisker from fusing open; performing a second sweep of the tin whisker at a second voltage, wherein the second voltage is selected to prevent the tin whisker from fusing open; and measuring an electrical resistance of the tin whisker after breaking down the oxide.

FIG. 1 shows a schematic of the test set-up 101. The development of the method used for this invention used micromanipulators in ambient and vacuum environments to measure the resistance of tin whiskers. A semiconductor parameter analyzer was used to apply voltage and measure resulting current. A current compliance was set to prevent excessive current that could fuse the whisker open. A semiconductor parameter analyzer was not required for the work. A voltage sweep could have been performed with an inline resistor to limit current and then a second sweep performed with the resistor removed.

A first probe 102 and a second probe 103 were used to form a circuit with the whisker 104. All whiskers 104 were attached to a substrate 105 so one probe 102 was placed on the substrate 105 and the other on a whisker 104. This method could have been used for detached whiskers or for measurements along a whisker by positioning both probes 102, 103 on the region of interest for the whisker 104.

Probes 102, 103 form a circuit with at least one contact point on the whisker 104. In an illustrative embodiment, the probes 102, 103 are placed using micromanipulators that can operate in a variety of environments, including controlled (vacuum) environments. In an illustrative embodiment, the testing can be performed in an inert atmosphere to delay the time it takes for the damaged oxide to reform. The semiconductor characterization apparatus 106 supplies voltage and measures the resulting current. Two sweeps are performed. The first sweep breaks down the oxide and includes a current limiting to prevent the whisker from fusing open. The second sweep is performed at lower voltages that will not produce sufficient current to fuse the whisker open. In an illustrative embodiment, the semiconductor apparatus 106 can be replaced with other methods of measuring current and supplying voltage but must include a method for limiting current on the first voltage sweep that does not influence current on the second sweep.

Measurement of oxide breakdown using a microprobe station in ambient conditions has been demonstrated. A second sweep to measure electrical resistance was not performed nor were any measurements with the inline resistor removed report. Accurately measuring the resistance of the whisker would require removal of the whisker.

In an illustrative embodiment, the advantage of the method described herein is that it allows for direct measurement of the resistance of metallic whiskers that includes potential microstructure effects and does not require extrapolation from ideal electrical properties of bulk materials. The set-up allows for testing resistance in a variety of environments: if the probes can be positioned, then the resistance of the whisker can be measured. The set-up also allows for measurement of time dependent variables, such as how long it takes for the oxide to reform in various environments.

In an illustrative embodiment, the method described herein can be used for measuring the electric properties of micro and nanoscale filaments that readily oxidize. In an illustrative embodiment, the method can be used for removing organic films or other contaminants without damaging a circuit for semiconductor quality control, reverse engineering, and/or failure analysis.

Example I

Shock, Vibration, and Screening of Hardware

A previously fielded, hermetically-sealed electronic unit from a manufacturing lot known to have whisker induced anomalous behavior was evaluated. Previous issues led to the development of a screening test capable of detecting whisker induced anomalous behavior. When whiskers were present, a unique electrical signature was observable in the power spectral density and autocorrelation functions of the unit's output signal. The manufacturer has stated that no other phenomenon is believed to produce the signature.

The test unit evaluated exhibited whisker induced anomalous behavior after approximately nine years in service. The behavior was detected during screening. The unit was then shipped in vibration absorbing packaging to an office environment and stored for approximately two years prior to the evaluation summarized herein.

Application representative shock and vibration tests were performed on the unit. The whisker screening test was performed on the unit prior to any shock and vibration testing and then again after each shock and vibration test. A total of seven shock and vibration tests were performed and are summarized in Table I. Vibration tests were performed for 60 seconds each. Shock tests consisted of three shocks per axis, with the first two shocks being 25% the magnitude of the full profile and the third being the full magnitude. The unit was unpowered during all shock and vibration tests.

Prior to shock and vibration testing, screening was performed with the unit physically oriented in six different ways. The orientations correspond to alignment of the positive and negative X, Y, and Z axes with gravity. This testing was repeated after the completion of the first six shock and vibration tests and again after the final vibration test. Screening was performed along a single axis in between the first six shock and vibration tests with the orientation corresponding to that used for the screening test when fielded.

The results of the whisker screening are summarized in Table I. Prior to shock and vibration, there was no evidence of whisker induced anomalous behavior in any orientation. After the first vibration test, there was a strong signature for whisker induced anomalous behavior. This signature was present after the subsequent two vibration and three shock tests. The unit returned to normal conditions during evaluation of the final orientation of the six-axis screening. Additional pertinent screening details include:

- The first three vibration tests and first shock test were performed on the same day. The remaining shock tests were performed the next day.
- Screening after z-axis shock was performed 0.4 and 18.2 hours after shock testing with whiskers detected during both screenings. The unit was unpowered between screenings.
- Screening after x-axis shock indicated whiskers were present for the first 5 axes evaluated, corresponding to 1.5 to 2.8 hours after shock testing. The anomalous behavior ceased on evaluation of the sixth axis 3.1 hours after shock testing, and 1.6 hours of continuous operation.
- Six-axis screening performed 4 days after shock testing showed anomalous behavior in only a single orientation but no other orientations.
- No anomalous behavior was detected during six-axis screening 19 days after shock testing.
- The final vibration test was performed 29 days after the final shock test.

TABLE I

SUMMARY OF WHISKER SCREENING RESULTS AND SHOCK AND VIBRATION TEST STEPS. STEPS ARE IN SEQUENTIAL ORDER.

| Step | Description | Notes |
|---|---|---|
| 1 | Six-axis screening | Whiskers not detected |
| 2 | Z-axis vibration: 20-2000 Hz, 10.4 $G_{rms}$ | Whiskers detected |
| 3 | Y-axis vibration: 20-2000 Hz, 11.2 Grms | Whiskers detected |
| 4 | X-axis vibration: 20-2000 Hz, 11.2 Grms | Whiskers detected |
| 5 | Z-axis shock: 20-10,000 Hz, 245 Gpeak | Whiskers detected |
| 6 | Y-axis shock: 20-10,000 Hz, 50 Gpeak | Whiskers detected |
| 7 | X-axis shock: 20-10,000 Hz, 50 Gpeak | Whiskers detected. Unit returned to normal operation after 1.6 hours |
| 8 | Z-axis vibration: 20-2000 Hz, 6.24 Grms | Whiskers not detected |

The unit was deconstructed one month after the final vibration test. Periodic screening during that time did not detect any anomalous behavior. Internal gas analysis was performed prior to deconstructing the unit. The internal gas was found to be 99.4% nitrogen with the remainder being other inert gasses. Oxygen was below detectable limits for the instrument, estimated to be less than 1 ppm.

Nodes suspected of being responsible for the anomalous behavior were intentionally shorted during deconstruction to independently verify the screening test. Nodes were shorted using 191, 475, and 1000Ω chip resistors. The signature associated with whisker induced anomalous behavior was observed when the nodes were shorted with the 191 resistor but not the 475 or 1000Ω resistor. The resistance dependent presence of the anomalous behavior was aligned with information reported by the manufacturer.

Figure 2A:
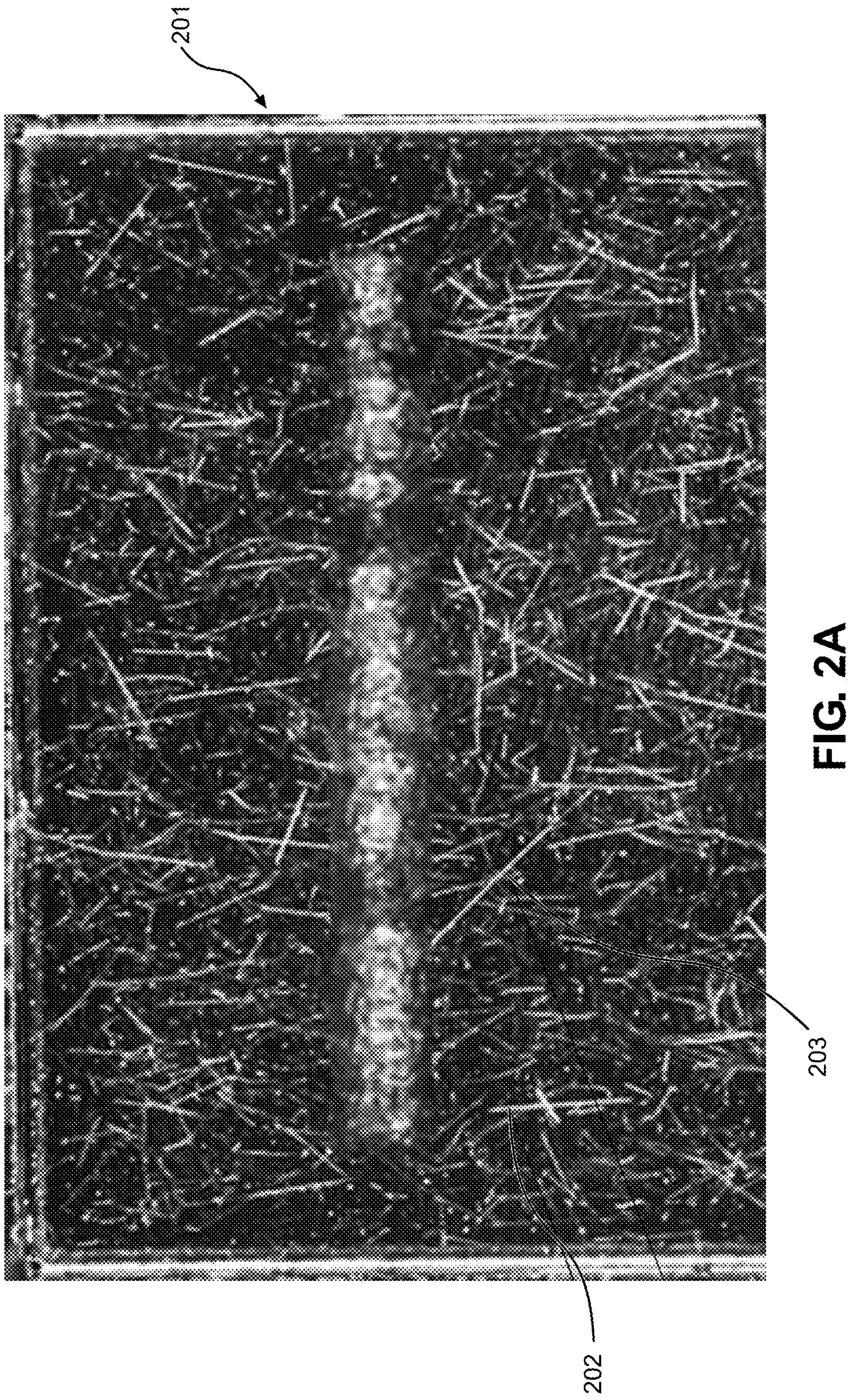
FIG. 2A shows view a of the EMI shield containing tin whiskers.

The presence of tin whiskers on the electro-magnetic interference (EMI) shield was verified during deconstruction. Detached whiskers were also found on CCAs. The front side of the EMI shield 201 is shown FIG. 2A. Whiskers 202 were observed on the front and back sides of the shield 201, including whiskers of sufficient length 203 to short the EMI shield to nodes known to produce the anomalous behavior.

Figure 2B:
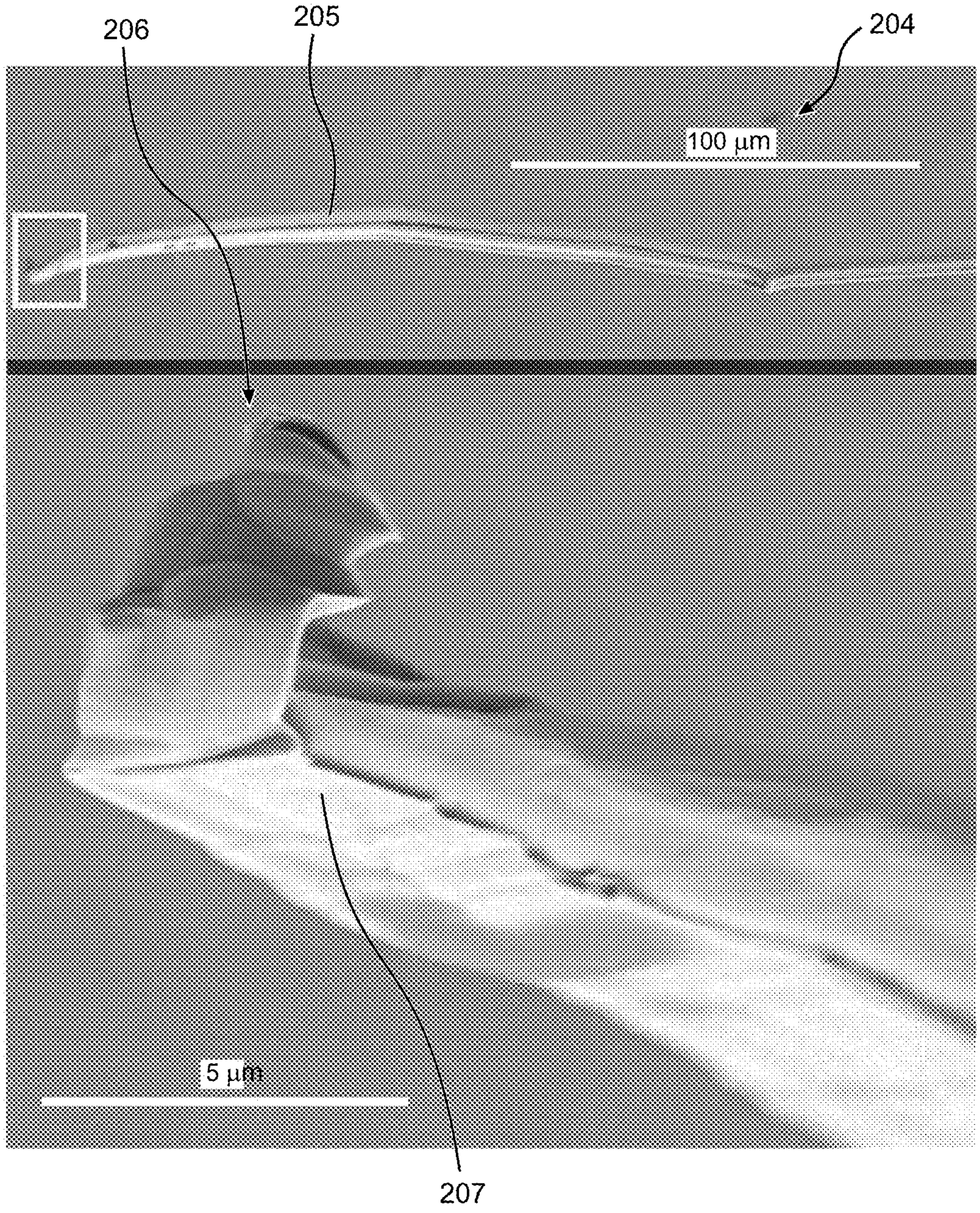
FIG. 2B shows SEM micrographs showing whisker morphology indicating the whisker is fused open.

FIG. 2B shows SEM micrographs 204 showing whisker 205 morphology indicating the whisker is fused open. Whiskers 205 were inspected via scanning electron microscopy (SEM), specifically to look for morphology that would indicate a fusing event. A single whisker 205 exhibited morphology that could indicate a fusing event. This was based on the whisker tip 206 morphology being unique to other whiskers on the shield and morphologies observed in previous investigations, specifically, the softening of striations near the tip 206 and the presence of a partial skin 207 that differed from the rest of the whisker 205. The whisker 205 was located on the correct side and approximate location to create a potential short.

Oxide Breakdown and Whisker Resistance

The electrical properties of tin whiskers were measured in a vacuum environment and in ambient conditions. Measurements were made on the EMI shield removed from the hardware discussed in the previous section. An additional EMI shield from a previous investigation was also used for characterization. The shield came from the same unit type and generation of manufacturing.

Figure 3:
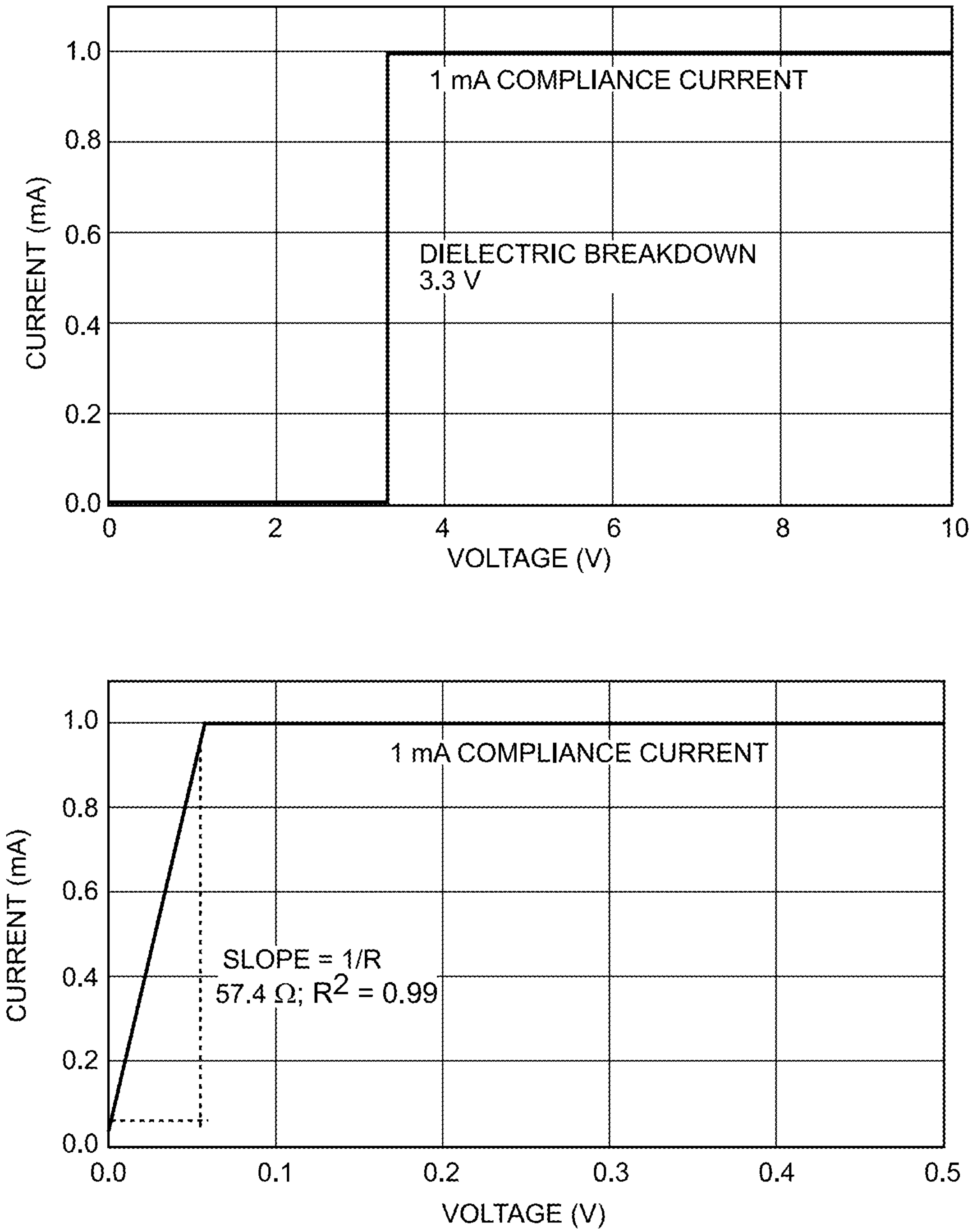
FIG. 3 shows a graph of current as a function of voltage sweep to determine oxide breakdown voltage (top) and the electrical resistance of a tin whisker (bottom).

All electrical measurements were made with a Keithley 4200 semiconductor characterization system. Three voltage sweeps were performed per whisker with a current compliance of 1 mA set to prevent fusing whiskers. The voltage sweeps were performed in series with the first two sweeps between 0 and 10 V with a step size of 10 mV. The third sweep was from 0 to 1 V with a step size of 1 mV. The first sweep was used to determine the dielectric breakdown potential, corresponding to the voltage resulting in a sudden increase in current to compliance. The second sweep was used to determine if the oxide was damaged and that the whisker was still in good contact with the probe. The third sweep was used to determine the resistance of the tin whisker corresponding the inverse of the slope of the V-I curve prior to hitting compliance. A representative curve trace for the first and third sweep is shown in FIG. 3. It should be noted that current limiting is automatically performed by reducing the applied voltage from the programmed voltage until current compliance is met. The plots in FIG. 3 both show the programmed voltage but the actual applied voltage was less once compliance was reached.

For the vacuum environment, voltage sweeps were performed in a Hitachi SU-5000 SEM with an Imina miBot microprobe station. Typical chamber pressure in the SEM during measurements was 4.2×10-4 Pa. Both EMI shields were used for this evaluation with 18 whiskers measured on one and 12 on the other. A gold-sputtered tungsten probe was used as the measurement probe to make contact with individual whiskers with a ground probe buried in the tin plating. The circuit resistance was measured by burying the measurement probe at the four corners and approximate center of the EMI shield and recording current as a function of voltage between 0 and 1 V with a step size of 1 mV, resulting in an average resistance of 10.5+/−0.8Ω.

Figure 4:
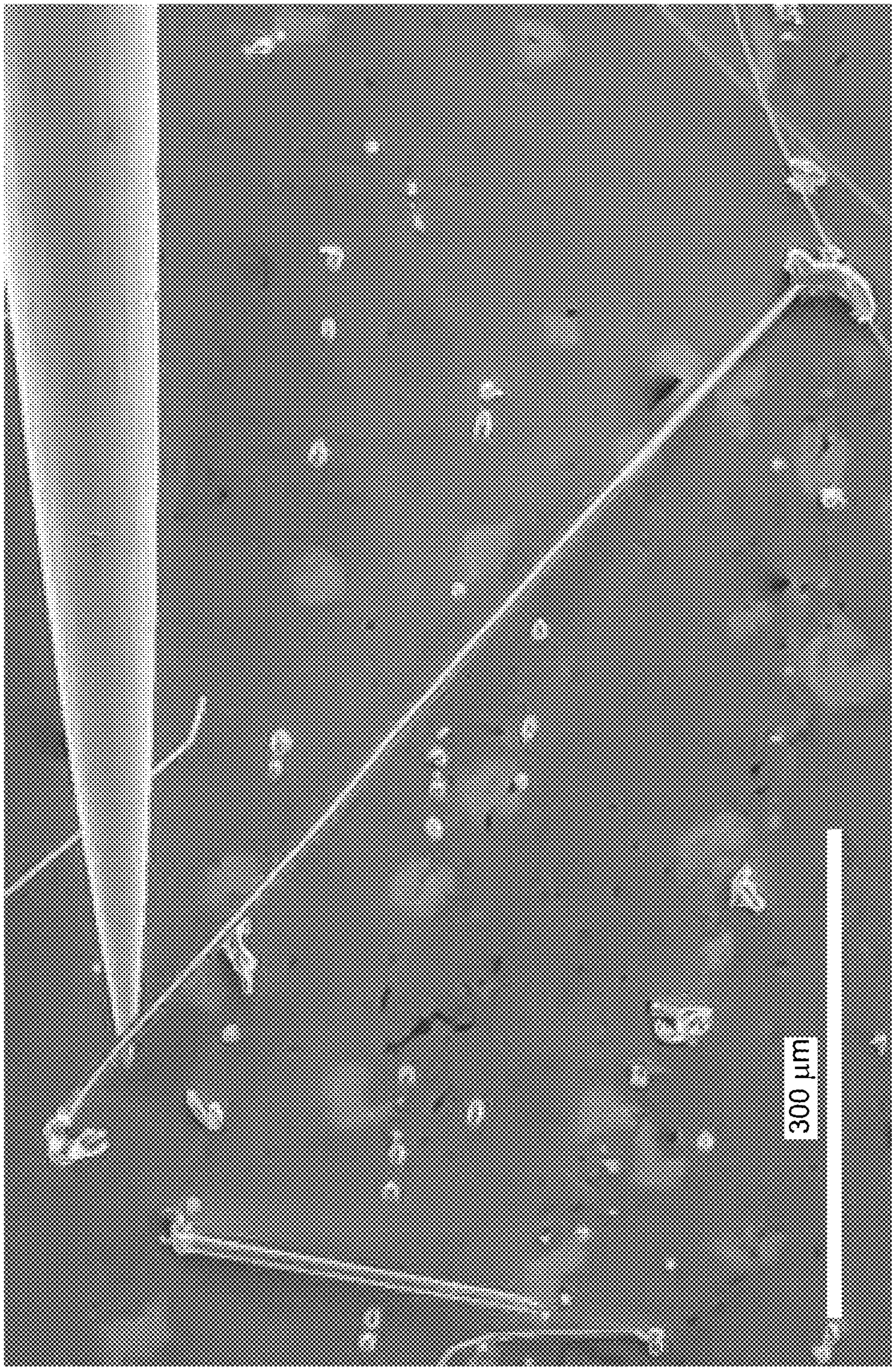
FIG. 4 shows an SEM micrograph showing a probe in contact with a single tin whisker for measurement of electrical properties in vacuum conditions.

Individual whiskers were measured by positioning the measurement probe under the whisker using the SEM to view the position of the probe relative to the whisker. The probe was then lifted until a slight physical shift in the whisker was observed. An example of probe placement is shown in FIG. 4. The net movement of the whisker could not be calculated but is estimated to be less than 100 nm, based on the sensitivity of the microprobe station. The electron beam was blanked once the probe was positioned to prevent the beam from affecting electrical measurements. Probes were replaced daily with fresh gold sputtered probes to minimize changes in contact resistance and maximize probe cleanliness.

Figure 5:
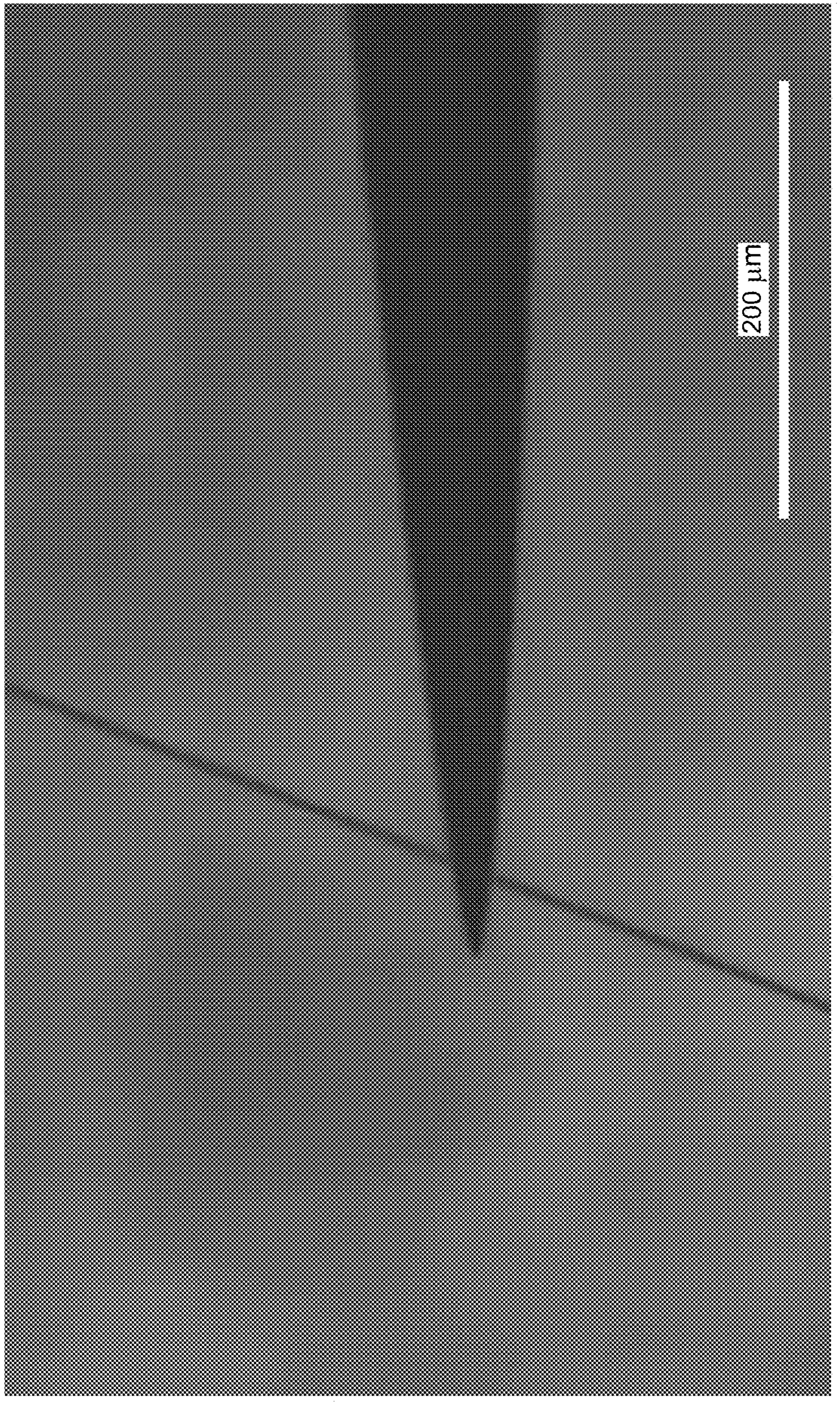
FIG. 5 shows an optical micrograph of a probe in contact with a tin whisker for measurement of electrical properties in ambient conditions.

For measurements in ambient conditions, an AxisPro micromanipulator system was used to position a gold sputtered tungsten probe under a whisker. The probe was then lifted until a small physical shift in the whisker could be observed. Probes were similarly replaced daily with freshly gold sputtered probes to minimize changes in contact resistance and maximize probe cleanliness. An example of the probe placement is shown in FIG. 5. All measurements in ambient conditions were made on the EMI shield from a previous investigation.

The oxide breakdown voltage and resistance of 60 whiskers was evaluated with 30 evaluated in vacuum and 30 evaluated in ambient conditions. For whiskers measured in vacuum, the length and diameter of the whisker was measured via SEM. All whiskers exhibited oxide breakdown at less than 10 V. Prior to breakdown, the whisker behaved as a dielectric with conduction limited to single nano-amps. Oxide breakdown was not observed on the second sweep for any whisker with the whiskers instead exhibiting ohmic resistance. The resistance of the whiskers was successfully measured for each of the 30 whiskers on the third voltage sweep.

Figure 6:
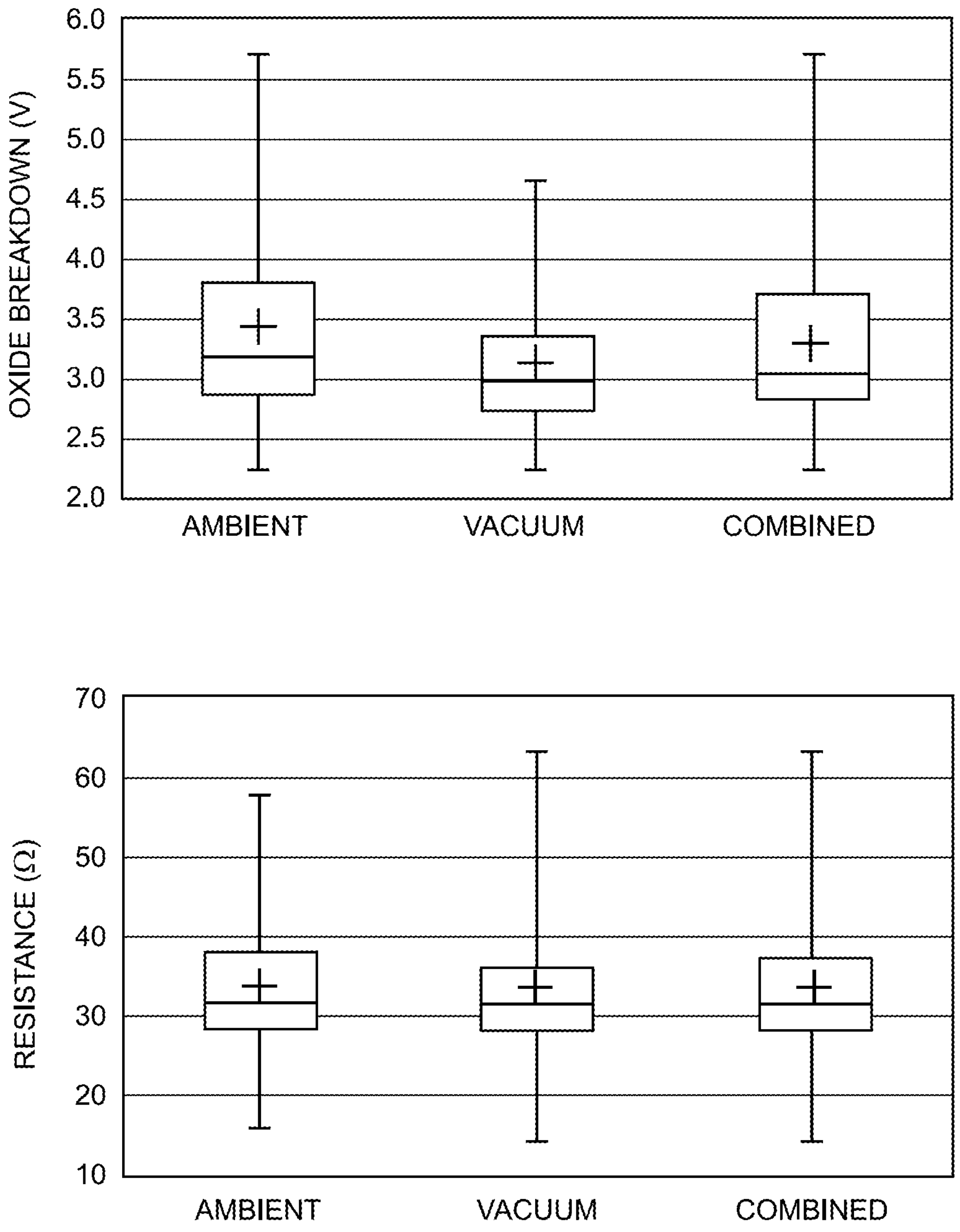
FIG. 6 shows a box and whisker plot indicating the distribution of oxide breakdown (top) and whisker resistance (bottom) for 30 tin whiskers measured in vacuum, 30 in ambient conditions, and the agglomeration of all 60.

A summary of the oxide breakdown voltage and whisker resistance for each whisker is shown Table III. Box and whisker plots for condition specific datasets for oxide breakdown voltages and whisker resistance are shown in FIG. 6. An outlier analysis was performed as defined by values greater than 1.5 times the inner quartile. No oxide breakdown voltages were outliers. One resistance measured in vacuum was an outlier, being 99.4Ω. Five (5) resistances measured in ambient conditions were outliers, being 112, 237, 282, 433, and 472Ω. A possible explanation for outliers is included in the discussion. The average, condition specific values with outliers eliminated is shown in Table II.

A two-tail t-test assuming equal variance was performed on the data sans outliers and returned a value of 0.15 for oxide breakdown and 0.89 for resistance, indicating the two sets were not statistically different. The summary of the combined data set is shown in Table II. Oxide breakdown ranged between 2.2 and 5.7 V with an average potential of 3.3+/−0.8 V. Resistance ranged between 16.1 and 63.0Ω with an average resistance of 33.7+/−10.4Ω. Box and whisker plots for the combined datasets for oxide breakdown and resistance is shown in FIG. 6.

TABLE II

SUMMARY OF ELECTRICAL PROPERTIES OF TIN WHISKERS MEASURED IN VACUUM AND AMBIENT CONDITIONS. OUTLIERS WERE REMOVED FROM RESISTANCE CALCULATIONS.

| | | Vacuum | Ambient | Combined |
|---|---|---|---|---|
| Breakdown (V) | Average | 3.4 | 3.1 | 3.3 |
| | St. Dev. | 0.9 | 0.6 | 0.8 |
| | Min | 2.3 | 2.2 | 2.2 |
| | Max | 5.7 | 4.7 | 5.7 |
| Resistance (Ω) | Average | 33.9 | 33.5 | 33.7 |
| | St. Dev. | 10.1 | 10.9 | 10.4 |
| | Min | 16.1 | 14.2 | 14.2 |
| | Max | 57.4 | 63.0 | 63.0 |

The effective resistivity of each whisker was also calculated by subtracting the average circuit resistance from individual whisker resistance and then normalizing using the whisker diameter and length. These results are also shown in Table III. Ideal resistivity of polycrystalline tin is 1.09×10 7 Ωm. Reported results are not intended to represent actual resistivity but instead provide a reference to expected values. Calculated resistivities ranged between 2.7×10-8 and 5.7×10 7 Ωm, with an average of 2.4×10 7+/−1.7×10 7 Ωm, showing alignment between measurements and expected values.

TABLE III

SUMMARY OF ELECTRICAL PROPERTIES OF WHISKERS MEASURED IN VACUUM AND AMBIENT CONDITIONS. MEASUREMENTS IN THE SAME ROW BETWEEN VACUUM AND AMBIENT CONDITIONS ARE NOT FROM THE SAME WHISKER, RESISTANCES IN BOLD CONSIDERED TO BE STATISTICAL OUTLIERS.

| Vacuum Measurements | | | | | | Ambient Measurements | |
|---|---|---|---|---|---|---|---|
| Diameter, (μm) | Length, (μm) | Breakdown Voltage (V) | Resistance (Ω) | Resistance Less Measurement Circuit (52) | Resistivity (Ω * m) | Breakdown Voltage (V) | Resistance (Ω)μ |
| 5.5 | 275 | 3.1 | 21.4 | 10.9 | 3.0E−07 | 3.7 | **433.0** |
| 6.7 | 389 | 2.5 | 21.7 | 11.2 | 3.2E−07 | 2.6 | 26.7 |
| 2 | 203 | 3.7 | 28.1 | 17.6 | 8.7E−08 | 2.7 | 27.2 |
| 2.9 | 280 | 3.7 | 35.5 | 25.0 | 1.9E−07 | 3.3 | 28.0 |
| 6.4 | 1480 | 2.9 | 99.4 | **88.9** | 6.2E−07 | 3.8 | 39.1 |
| 2.4 | 812 | 2.9 | 57.1 | 46.6 | 8.3E−08 | 3.4 | 30.7 |
| 3.9 | 554 | 3.3 | 57.4 | 46.9 | 3.2E−07 | 2.8 | 39.8 |
| 6 | 1473 | 3.2 | 28.1 | 17.6 | 1.1E−07 | 2.6 | 47.6 |
| 5.3 | 1320 | 2.9 | 30.9 | 20.4 | 1.1E−07 | 4.7 | 29.1 |
| 3.3 | 815 | 3.7 | 41.1 | 30.6 | 1.0E−07 | 2.9 | 30.3 |
| 2.5 | 1090 | 5.6 | 47.7 | 37.2 | 5.3E−08 | 2.5 | **237.4** |
| 4.4 | 1212 | 3.4 | 29.1 | 18.6 | 7.4E−08 | 2.8 | **112.3** |
| 7 | 2067 | 5.7 | 33.4 | 22.9 | 1.4E−07 | 3.0 | 36.1 |
| 8.9 | 635 | 4.5 | 16.1 | 5.6 | 1.8E−07 | 3.3 | 34.8 |
| 4.1 | 2280 | 3.9 | 49.0 | 38.5 | 7.1E−08 | 2.9 | 29.3 |
| 4.7 | 398 | 3.1 | 37.8 | 27.3 | 3.8E−07 | 2.2 | 31.9 |
| 2.5 | 1820 | 3.4 | 42.6 | 32.1 | 2.8E−08 | 3.0 | **472.4** |
| 5.5 | 1310 | 5.1 | 23.5 | 13.0 | 7.5E−08 | 2.7 | 63.0 |
| 7.4 | 508 | 2.6 | 28.3 | 17.9 | 4.8E−07 | 3.7 | 28.0 |
| 5.7 | 849 | 3.9 | 31.8 | 21.3 | 2.0E−07 | 3.0 | 34.1 |
| 8.7 | 717 | 4.2 | 26.8 | 16.3 | 4.3E−07 | 3.0 | 53.3 |
| 8.4 | 554 | 2.8 | 28.6 | 18.1 | 5.8E−07 | 4.5 | 23.2 |
| 6.8 | 348 | 3.1 | 26.5 | 16.0 | 5.3E−07 | 4.1 | 36.2 |
| 3.9 | 778 | 3.2 | 31.5 | 21.0 | 1.0E−07 | 3.0 | 23.7 |
| 7.7 | 604 | 2.3 | 32.1 | 21.6 | 5.3E−07 | 2.7 | **282.7** |
| 4.2 | 258 | 2.4 | 34.3 | 23.8 | 4.1E−07 | 2.8 | 31.3 |
| 5.5 | 376 | 3.8 | 28.9 | 18.4 | 3.7E−07 | 2.6 | 50.8 |
| 4.1 | 374 | 2.9 | 30.6 | 20.1 | 2.3E−07 | 3.6 | 14.2 |
| 3.5 | 358 | 2.8 | 35.6 | 25.1 | 2.2E−07 | 2.7 | 18.3 |
| 5.8 | 586 | 2.9 | 47.4 | 36.9 | 5.3E−07 | 3.0 | 31.3 |

Fusing Current

The effect of increased current was evaluated on whiskers in vacuum and ambient condition. Three different currents were evaluated, being 10, 20, and 30 mA. Voltage was automatically adjusted using a Keithley 4200 semiconductor characterization system to reach the current. Bias was applied for two minutes. Five whiskers were evaluated in vacuum and five in ambient conditions for a total of 10 whiskers evaluated per current. Probes were placed using the same method described for electrical property measurements.

Figure 7:
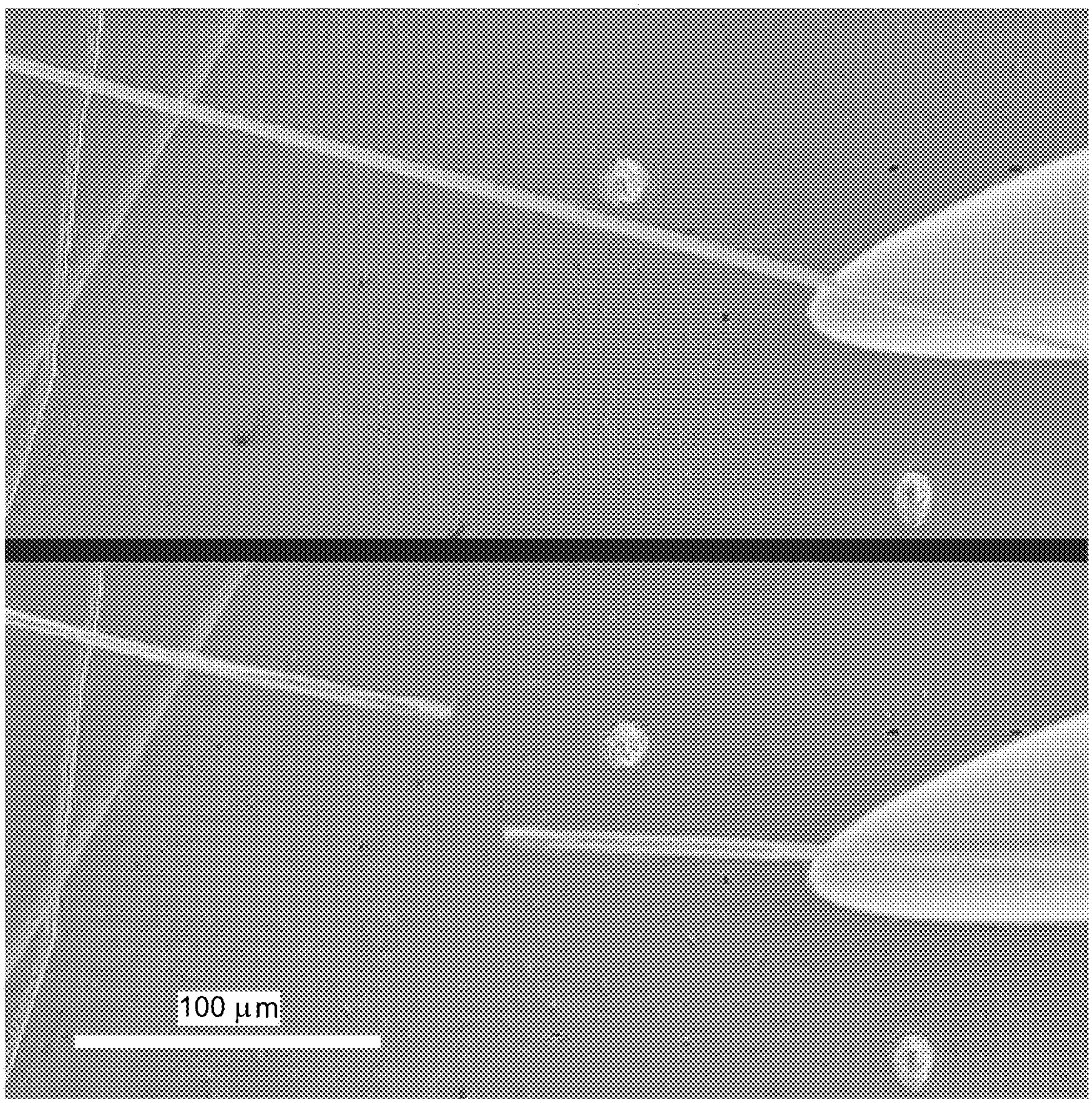
FIG. 7 shows SEM micrographs showing before (top) and after (bottom) 10 mA of current resulting in the whisker fusing open.

Two of ten whiskers fused open with 10 mA of current with one fusing open in ambient conditions and the other fusing open in vacuum. The whisker that fused open in ambient conditions fused open after 90 seconds of current. The whisker that fused open in the SEM fused open within 100 ms. An SEM micrograph of the whisker that fused open with 10 mA in vacuum is shown in FIG. 7. The eight remaining whiskers tested at 10 mA did not fuse during testing.

Seven of ten whiskers fused open with 20 mA of current with three fusing open in ambient conditions and four fusing open in vacuum. All whiskers fused open within 100 ms. The three remaining whiskers tested at 20 mA did not fuse during testing. All ten whiskers fused open at 30 mA.

Time Delayed Measurements

The first two voltage sweeps reported in electrical property measurements were repeated on 6 whiskers. The third sweep was performed 15 minutes after the second sweep. Three whiskers were evaluated in vacuum and three were evaluated in ambient conditions. All 3 whiskers evaluated in vacuum and 2 of the 3 evaluated in ambient conditions exhibited ohmic resistance on the thirds sweep (after 15 minutes) with no evidence of oxide breakdown; one of the 3 evaluated in ambient condition showed oxide breakdown.

Additional time delay measurements were performed on one whisker in ambient conditions, evaluating delays out to 1 hour. Times evaluated included 5, 10, 15, 20, 30, and 60 minutes. The amount of time elapsed was based on the time since the previous voltage sweep, e.g. 60 minutes elapsed before measurement after the 30 minute measurement. The probe was not repositioned between measurements. Ohmic resistance with no evidence of dielectric breakdown was measured at each time step.

Discussion of Results

The results from the hardware evaluated indicate that mechanical agitation can result in whisker conduction at voltages less than that needed to breakdown the oxide. The hardware evaluated only presented evidence of tin whisker induced anomalous behavior after unpowered shock and vibration testing. Per the manufacturer, nodes at risk of shorting have a potential of less than 1.5 V, less than the 2.2 V minimum oxide breakdown measured herein.

The finding that mechanical agitation can result in whisker conduction is significant to the development of whisker mitigation models for systems that operate under shock and vibration loading, including automotive, aerospace, and in low voltage circuits increases if voltage-based oxide breakdown is not a requirement for conduction. This finding is also significant to systems that experience long-term benign storage conditions but aggressive applications, not uncommon in defense applications. These systems typically have periodic performance checks during storage but the detection of whiskers could be limited if screening does not include application representative shock and vibration.

A. Outliers, Contact Resistance, and Sustained Shorts

One of 30 whiskers measured in vacuum and 5 of 30 whiskers measured in ambient conditions were considered outliers. Increased contact resistance would explain an increase in the overall measured resistance of the circuit. It is also a possible explanation for why there were more outliers measured in ambient conditions than in vacuum. Probe placement in vacuum was performed using the SEM to position the probe versus optically for ambient conditions. The SEM offered significantly higher resolution for probe placement to avoid whisker kinks and surface imperfections that could affect the overall contact area between the probe and whisker. This was not possible with the optical resolution. The improved resolution of the SEM also allowed a contact area closer to the probe tip where probe diameter is minimal. Ambient measurements were made further down the probe where the diameter was larger. The larger probe diameter could result in an increased probability of a whisker kink or surface imperfection being the primary contact point with the probe, reducing actual contact area and increase contact resistance.

The effect of contact resistance should be considered in risk mitigation models, especially in low voltage applications. If increased contact resistance is being created by a resistive material, such as an organic film or non-continuous oxide film, higher voltages may breakdown those materials and reduce contact resistance. As an example, the lowest voltage required to break down the whisker oxide was 2.2 V. If the oxide was partially removed from the contact area and/or if the whisker shifted slightly on the probe after the initial sweep, then there would be oxide in the contact area. All resistance measurements were performed with voltages less than 1V that would not further degrade the oxide. This is analogous to a whisker with an oxide that is partially damaged from mechanical agitation in contact with an opposing conductor with a potential less than that of the dielectric breakdown.

The combined resistance can be modeled as two resistors in series, being the resistance of the whisker plus the contact resistance. If a short is created by a whisker and there is a high contact resistance between the whisker and opposing conductor, then there is the potential for a sustained short. The work performed showed that 8 of 10 (80%) whiskers could support 10 mA of current and three of ten could support 20 mA of current. All 60 whiskers could support 1 mA. Outlier circuit resistances measured ranged from defense applications. The probability of a whisker induced short 99.4 to 472Ω. At the high end of these resistances, a whisker able to conduct 10 mA would result in a sustained short for up to 4.7 V. This assertion does assume that a majority of the power dissipation is occurring at contact point, where the contact resistance is significantly higher than the whisker but the ability to dissipate heat would be greater than in the span of the whisker.

Figure 8:
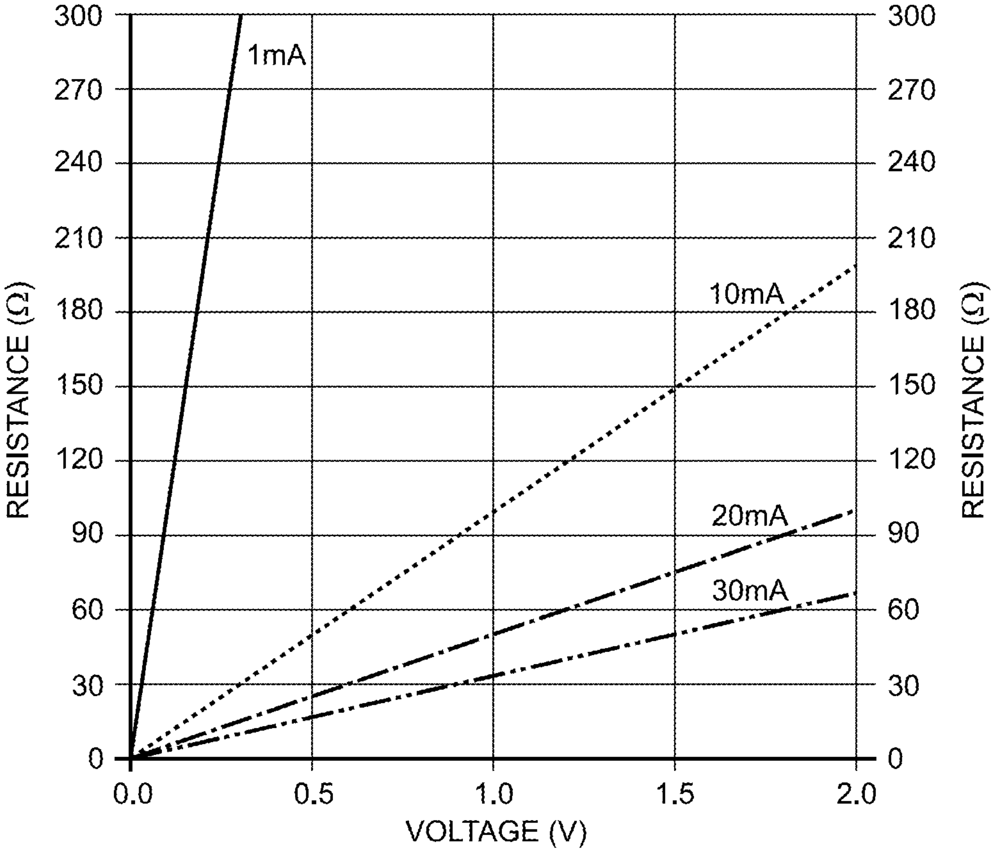
FIG. 8 shows a graph of the minimum required circuit resistance as a function of circuit voltage that would result in a sustained short for whiskers capable of maintaining 5, 10, 20, and 30 mA.

FIG. 8 shows minimum circuit resistance, being the combination of whisker resistance and contact resistance, as a function of voltage that could result in a sustained short for whiskers capable of maintaining 5, 10, 20, and 30 mA for up to 2 V. For the hardware evaluated, it was shown that a 191Ω short would result in the anomalous behavior characteristic of tin whiskers. A whisker capable of conducting 10 mA would not fuse open at this resistance as the circuit voltage is less than 1.5 V. Therefore, a single whisker could induce the sustained anomalous behavior observed during this study.

B. Sustained Oxide Damage

The results show that damaged oxide on a tin whisker may stay damaged for an extended period of time. Electrical measurements of whiskers showed immediate conduction and ohmic resistance after the oxide was damaged with voltage in both vacuum and ambient conditions. Two of the three whiskers evaluated in ambient conditions were still conductive after 15 minutes and one whisker was still conductive after an hour.

All three whiskers measured in vacuum were still conductive after a 15 minute delay. While experiments were not conducted to determine how long a whisker would remain conductive in vacuum, it is reasonable to assume that it would take longer to form a protective oxide on a whisker in vacuum versus ambient conditions as the availability of oxygen in a vacuum is greatly reduced. This is analogous to whiskers in a hermetically sealed unit where oxygen concentration has been intentionally reduced, typically to a concentration of less than 1 ppm.

The effect of the probe being stationary between electrical measurements was not evaluated. The flexibility of the whisker and the inability to detect where the oxide was damaged, which made it impractical to remove the probe between measurements and have confidence that the probe was repositioned in the same location. From the perspective of developing a risk mitigation model, however, this static probe is more representative. A system where the oxide is damaged through mechanical agitation would damage oxide at the points of contact. For real systems, where probes placement is not intentional and the cleanliness of contact surfaces is not controlled, it is reasonable to assume that a high resistance contact is more likely, which further increases the probability of a sustained short.

C. Intermittency of Evaluated Hardware

The hardware evaluated exhibited intermittency of the whisker induced anomalous behavior. The hardware was pulled from service due to a failed screening but no evidence of anomalous behavior was detected after the unit had sat dormant for 2 years. Whiskers were again detected after shock and vibration testing but were undetectable after 1.6 hours of continuous operation that included handling to reposition the unit. Whiskers were again detected 4 days later but only in a specific orientation. No whiskers were detected afterwards, even with additional vibration testing.

The observed intermittent behavior could be a result of slow healing of the whisker oxide combined with fusing of whiskers. The slow healing of the oxide is supported by the absence of anomalous behavior following 2 years of dormant storage. The shock and vibration of field screening activities are not specifically known, but the processes included shipping and handling, which subjects the larger system to shock and vibration. Shipping and handling are comparatively more severe than the handling of the unit in an office environment after it had been removed from the larger system. The elapsed time and gentle handling of the unit may have allowed the oxide to reform using the limited oxygen available in the unit. The vibration testing then damaged the oxide and the whiskers could again be detected.

An alternative possibility to explain the intermittent behavior is that the mechanical agitation caused whiskers to bridge nodes not previously shorted. The probability of this occurring has to be weighted with the anomalous behavior remaining after two additional vibration tests and three shock tests that would have likely broken the new connection. Additionally, circuit voltage is known to be less than 1.5 V, lower than the 2.2 V lowest oxide breakdown voltage measured.

The return of the normal functionality of the unit during repositioning of the hardware can be explained by a whisker or multiple whiskers fusing open. Fusing of whiskers is supported by the presence of a whisker with a suspect fused morphology, shown in FIG. 2. Additionally, the tin whisker signature was lost after 1.6 hours of continuous operation that included gentle handling and repositioning. Three non-mutually exclusive scenarios are presented that would explain the time dependency of whiskers fusing open. First, the additional handling may have further damaged the oxide and subsequently reduced the contact resistance. This would have increased current through the whisker, fusing it open. Second, two or more whiskers may have shorted the node in parallel with the combined resistance low enough to induce an anomalous event. Repositioning the unit may have caused one or more of the whisker shorts to disconnect from the node, increasing the resistance above the minimum to induce an anomalous event. Third, the current from continuous operation of the unit caused both the internal environment and whiskers to heat up, which eventually caused the whiskers to fuse open.

The tin whisker characteristic signal returned 4 days after the shock and vibe tests, when the unit was oriented in one of the six test conditions. A likely explanation is that repositioning caused a whisker to shift into contact with a node. Similarly, a detached whisker could have shifted to short the node to a ground point.

D. Dielectric Breakdown Voltage

All whiskers evaluated showed oxide breakdown of 5.7 V or less. The average oxide breakdown was 3.3+/−0.8 V. These results are significantly different than values reported in the prior art, with an average breakdown of 8.0+/−7.3 V and two whiskers that that exceeded 45 V without breakdown. Differences between the results herein and the values reported in the prior art could be due to a combination of probe placement and probe condition. The experiments herein and the prior art minimized contact force, however, contact was made by placing the probe under the whisker and lifting until movement could be observed; Prior art studies contacted from the side. Contacting from the bottom may improve contact by having the added benefit of gravity to keep the whisker in constant contact with the probe.

The probe condition may also play a role in the overall breakdown voltage. Tungsten probes, used during process development, produced more variable breakdown voltage measurements. Gold sputtered probes produced more consistent results. It was found that the gold sputtered probes needed to be replaced daily with freshly sputtered probes to produce the consistent results reported.

SUMMARY

The oxide breakdown voltage and resistance of 60 tin whiskers were measured in both vacuum and ambient conditions. Average oxide breakdown was 3.3+/−0.8V with a minimum of 2.2V. Average whisker resistance after oxide breakdown was 33.7+/−10.4Ω. Whisker resistance measurements were made possible by the slow healing of the oxide, allowing for low voltage measurements that did not exceed the fusing current of the whisker. Full conduction was observed for an hour after breaking the oxide in ambient conditions and it was hypothesized that oxide damage would be sustained for even longer in hermetic or vacuum applications where oxygen concentration is lower.

The significance of these results was discussed as related to hardware exhibiting behavior characteristic of a whisker induced anomalous event. Deconstruction of the hardware confirmed the presence of whiskers. The anomalous behavior was recreated by intentionally shorting suspect nodes together. The anomalous behavior was observed between two nodes with less than a 1.5 V potential difference and only after shock and vibration testing, leading to the conclusion that mechanical agitation damaged the oxide, which enabled subsequent and sustained shorting of nodes. Modeling circuit resistance as a combination of whisker resistance and contact resistance led to the conclusion that a single whisker would have resulted in the sustained, anomalous behavior.

The results from this evaluation should be considered when developing risk mitigation models for potential whisker induced anomalous behavior, particularly in applications that operate under shock and vibration loads. This includes mitigation models that use system checks in benign conditions to ensure a system is operational before deployment into an aggressive application: A whisker with the potential to induce anomalous behavior may not be detectable in low voltage circuits until there is shock or vibration.

Overall, the inventive method allows for direct measurement of the resistance of metallic whiskers that includes potential microstructure effects and does not require extrapolation from ideal electrical properties of bulk materials. The set-up described herein allows for testing resistance in a variety of environments and allows for measurement of time dependent variables, such as how long it takes for the oxide to reform in various environments.

Although the invention has been described in detail with reference to certain preferred embodiments, variations and modifications exist within the spirit and scope of the invention as described and defined in the following claims.

The invention claimed is:

1. A method of measuring an electrical resistance of a tin whisker comprising a region of interest after breaking down an oxide formed on said tin whisker, said method comprising:

forming a circuit on said region of interest wherein said circuit comprises a first probe, a second probe, and a substrate;

breaking down said oxide formed on said tin whisker without fusing open said tin whisker by performing a first sweep of said tin whisker at a first voltage;

performing a second sweep of said tin whisker at a second voltage without fusing open said tin whisker; and measuring said electrical resistance of said tin whisker after said breaking down said oxide.

2. The method of claim 1, performed in a vacuum environment.

3. The method of claim 1, performed in an ambient environment.

4. The method of claim 1, wherein said performing said first sweep comprises applying said first voltage using a semiconductor parameter analyzer.

5. The method of claim 1, wherein said performing said first sweep comprises applying said first said first voltage using an inline resistor.

6. The method of claim 5, wherein said performing said second sweep further comprises removing said inline resistor.

7. The method of claim 1, wherein said forming said circuit comprises attaching said substrate to said tin whisker, said method further comprising retarding reformation of a damaged oxide by placing said first probe is placed on said substrate and by placing said second probe on said tin whisker.

8. A method of measuring an electrical resistance of a tin whisker comprising a region of interest after breaking down an oxide formed on said tin whisker, said method comprising:

forming a circuit on said region of interest by attaching a substrate to said tin whisker;

retarding reformation of a damaged oxide by placing a first probe on said substrate and by placing a second probe on said tin whisker;

breaking down said oxide without fusing open said tin whisker by performing a first sweep of said tin whisker at a first voltage; and performing a second sweep of said tin whisker at a second voltage without breaking open said tin whisker; and measuring said electrical resistance of said tin whisker after said breaking down said oxide.

9. The method of claim 8, performed in a vacuum environment.

10. The method of claim 8, performed in an ambient environment.

11. The method of claim 8, wherein said performing said first sweep comprises applying said first voltage using a semiconductor parameter analyzer.

12. The method of claim 8, wherein said performing said first sweep comprises limiting a current by applying said first voltage using an inline resistor.

13. The method of claim 12, wherein said performing said second sweep comprises removing said inline resistor.

14. A method of measuring an electrical resistance of a tin whisker comprising a region of interest after breaking down an oxide formed on said tin whisker comprising:

forming a circuit on said region of interest;

breaking down said oxide without fusing open said tin whisker by performing a first sweep of said tin whisker at a first voltage; and performing a second sweep of said tin whisker at a second voltage without fusing open said tin whisker; and measuring said electrical resistance of said tin whisker after said breaking down said oxide.

15. The method of claim 14 performed in a vacuum environment.

16. The method of claim 14 performed in an ambient environment.

17. The method of claim 14, wherein said performing said first sweep comprises applying said first voltage using a semiconductor parameter analyzer.

18. The method of claim 14, wherein said performing said first sweep comprises applying said first said first voltage using an inline resistor.

19. The method of claim 18, wherein said performing said second sweep further comprises removing said inline resistor.

20. The method of claim 14, wherein said forming said circuit comprises attaching said tin whisker to a substrate, and said method further comprises retarding reformation of a damaged oxide by placing a first probe on said substrate and by placing a second probe on said tin whisker.

* * * * *